No. 777,734. Patented December 20, 1904.

UNITED STATES PATENT OFFICE.

JOSEPH KEMPNER, OF BERLIN, GERMANY.

PROCESS OF MAKING TRANSLUCENT OPAL GLASS.

SPECIFICATION forming part of Letters Patent No. 777,734, dated December 20, 1904.

Application filed August 4, 1904. Serial No. 219,432.

*To all whom it may concern:*

Be it known that I, JOSEPH KEMPNER, a subject of the Emperor of Germany, residing at 20 Flensburgerstrasse, Berlin, Germany, have invented a new and useful Process of Making Translucent Opal Glass, of which the following is a specification.

In my process I make the opal glass of sand, soda, feldspar poor of lime, and sodium silicofluorid.

In the process known till now the opal glass was made by adding alkaline silicofluorid to the usual glass-frit, (alkaline lime silicate;) but this addition causes difficulties, having a detrimental influence on the opalescence and the fusibility of the glass-frit. If no lime is added, then a suitable quantity of alumina must be introduced into the glass-frit, as is already well known in the manufacture of opal glass through the use of cryolite (an element containing fluorin.)

For the purpose of making in an economical way an opal-glass frit according to my invention the same is composed of sand, soda, feldspar poor of lime, and sodium silicofluorid, the two latter constituents in the proportion of two to one; but the feldspar of the mixture may amount to three-fourths and the sodium silicofluorid may sink to one-fourth. A suitable composition of a glass-frit is one hundred parts of a mixture of feldspar and sodium silicofluorid, one hundred and sixty to one hundred and eighty parts of silicic acid, and thirty-seven and one-half to fifty parts of soda. The choice in the sand and soda addition is to allow for the difference of temperature occurring at times in the oven.

The glass-frit mixture is suitable for a feldspar of the following composition: silicic acid, 68.15 per cent.; alumina, 18.58 per cent.; potash, 8.90 per cent.; soda, 3.45 per cent.; lime, 0.77 per cent.; magnesia, 0.11 per cent.; water, 0.04 per cent. The use of alumina in combination with sodium silicofluorid in manufacturing opal glass is already known; but such a glass-frit was never entirely free of lime.

Having now described the nature of my invention, what I claim is—

1. In a process of making opal glass the use of a glass-frit composed of sand, soda, feldspar poor of lime, and sodium silicofluorid the latter in the proportions of two to one, as and for the purpose specified.

2. In a process of making opal glass the use of a glass-frit composed of one hundred parts of feldspar and sodium silicofluorid, one hundred and sixty to one hundred and eighty parts of silicic acid and thirty-seven and one-half to fifty parts of soda, as and for the purpose specified.

JOSEPH KEMPNER.

Witnesses:
HENRY HASPER,
WILLIAM MAYNER.